United States Patent
Kwag et al.

(10) Patent No.: US 8,216,706 B2
(45) Date of Patent: Jul. 10, 2012

(54) BATTERY PACK

(75) Inventors: Nohyun Kwag, Yongin-si (KR);
Youngcheol Jang, Yongin-si (KR);
Kyungwon Seo, Yongin-si (KR);
Jaeyoung Ha, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 410 days.

(21) Appl. No.: 12/630,724

(22) Filed: Dec. 3, 2009

(65) Prior Publication Data
US 2010/0151281 A1    Jun. 17, 2010

(30) Foreign Application Priority Data
Dec. 16, 2008   (KR) .................. 10-2008-0127769

(51) Int. Cl.
*H01M 2/04* (2006.01)
*H01M 2/22* (2006.01)
(52) U.S. Cl. .............. 429/7; 429/62; 429/175
(58) Field of Classification Search ............... 429/7, 62, 429/175
See application file for complete search history.

(56) References Cited

U.S. PATENT DOCUMENTS

| | | | |
|---|---|---|---|
| 7,858,227 B2* | 12/2010 | Song et al. | 429/175 |
| 2002/0142195 A1* | 10/2002 | Ehara | 429/7 |
| 2006/0127755 A1 | 6/2006 | Cho | |
| 2006/0251930 A1* | 11/2006 | Kim | 429/7 |
| 2008/0102368 A1* | 5/2008 | Sumida et al. | 429/178 |
| 2008/0107964 A1 | 5/2008 | Choi | |
| 2008/0118825 A1 | 5/2008 | Yoon | |
| 2008/0131760 A1 | 6/2008 | Yamagami et al. | |
| 2008/0176134 A1* | 7/2008 | Kim | 429/175 |
| 2008/0292955 A1 | 11/2008 | Byun et al. | |
| 2009/0098418 A1* | 4/2009 | Byun et al. | 429/7 |
| 2009/0117412 A1* | 5/2009 | Koh et al. | 429/7 |
| 2009/0186261 A1* | 7/2009 | Seo et al. | 429/62 |

FOREIGN PATENT DOCUMENTS

| | | |
|---|---|---|
| EP | 1 814 189 A1 | 8/2007 |
| EP | 1 926 160 A1 | 5/2008 |
| JP | 2006-147574 | 6/2006 |
| JP | 2008-130549 A | 6/2008 |

(Continued)

OTHER PUBLICATIONS

Translation of KR 10-645256 published Nov. 6, 2006 obtained from the KIPO website.*

(Continued)

*Primary Examiner* — Robert B Davis
(74) *Attorney, Agent, or Firm* — Christie, Parker & Hale, LLP

(57) ABSTRACT

A battery pack includes a bare cell including a cap plate and an electrode terminal insulated from the cap plate and a circuit module including a circuit board having a first short side, a second short side generally opposite the first short side, a first long side and a second long side generally opposite the first long side. The circuit board includes a base lead plate attached to the circuit board and a base fixing protrusion extending from the base lead plate, wherein the circuit module is on and electrically connected to the bare cell. The battery pack also includes an upper cover covering the circuit module, the upper cover including a base fixing groove adapted to receive the base fixing protrusion, wherein base fixing protrusion is in the base fixing groove.

25 Claims, 12 Drawing Sheets

FOREIGN PATENT DOCUMENTS

| | | |
|---|---|---|
| JP | 2008-293940 | 12/2008 |
| KR | 1020070022888 A | 2/2007 |
| KR | 10-2008-0013212 A | 2/2008 |
| KR | 10-2008-0016050 | 2/2008 |
| KR | 1020080032913 A | 4/2008 |
| KR | 1020080035402 A | 4/2008 |
| KR | 1020080038663 A | 5/2008 |

OTHER PUBLICATIONS

Korean Notice of Allowance dated Mar. 9, 2011, for Korean Application 10-2008-0127769, 5 pages.

European Search Report dated Apr. 9, 2010, for corresponding European Patent application 09252795.1, noting listed references in this IDS.

\* cited by examiner

BATTERY PACK

CROSS-REFERENCE TO RELATED APPLICATION

This application claims priority to and the benefit of Korean Patent Application No. 10-2008-0127769 filed on Dec. 16, 2008, at the Korean Intellectual Property Office, the entire content of which is incorporated herein by reference.

BACKGROUND OF THE INVENTION

1. Field of the Invention

The present invention relates to a battery pack.

2. Description of the Related Art

Lithium secondary batteries may be in the form of a battery pack. The battery pack typically includes: a bare cell including an electrode assembly, a can accommodating the electrode assembly and a cap assembly adapted to cover an upper opening of the can; a circuit module including circuit devices such as a charging/discharging device and a protective circuit device, the circuit module coupled to an upper portion of the bare cell; and an upper cover coupled to an upper portion of the bare cell to cover the circuit module. The electrode assembly of the bare cell essentially includes a positive electrode plate, a negative electrode plate and a separator.

In recent years, battery packs have been constructed using an injection-molded upper cover and a bare cell coupled to the upper cover to achieve a relatively thin battery pack.

In such a battery pack, however, no support member is typically provided between the upper cover and the bare cell to support the upper cover against an external impact. When a strong external impact is applied to the battery pack, bending or twisting of the upper cover may occur, resulting in separation of the upper cover from the bare cell.

SUMMARY OF THE INVENTION

Aspects of the present invention provide a battery pack in which fixing protrusions formed in a circuit module coupled to a bare cell are fixedly fitted into respective fixing grooves formed in an upper cover to prevent bending or twisting of the upper cover by an external impact, so that the upper cover can be effectively prevented from being separated from the bare cell.

A battery pack includes a bare cell including a cap plate and an electrode terminal insulated from the cap plate and a circuit module including a circuit board having a first short side, a second short side generally opposite the first short side, a first long side and a second long side generally opposite the first long side. The circuit board includes a base lead plate attached to the circuit board and a base fixing protrusion extending from the base lead plate, wherein the circuit module is on and electrically connected to the bare cell. The battery pack also includes an upper cover covering the circuit module, the upper cover including a base fixing groove adapted to receive the base fixing protrusion, wherein base fixing protrusion is in the base fixing groove. In one embodiment, the circuit board is a flexible printed circuit board.

In one embodiment, the circuit module further comprises a dummy lead plate coupled to the circuit board, the dummy lead plate having a dummy fixing protrusion protruding toward the upper cover, wherein the upper cover further comprises a dummy fixing groove adapted to receive the dummy fixing protrusion, and wherein the dummy fixing protrusion is in the dummy fixing groove. Further, the base lead plate may be connected to a first side of the cap plate and the dummy lead plate may be connected to a second side of the cap plate.

In one embodiment, the base lead plate further includes a base coupling portion coupled to the first short side of the circuit board, a base bottom portion coupled to the cap plate, and a base connecting portion connecting the base coupling portion and the base bottom portion and wherein the base fixing protrusion is at an edge of the base bottom portion. Further, the dummy lead plate may further include a dummy coupling portion coupled to the second short side of the circuit board, a dummy bottom portion coupled to the cap plate, and a dummy connecting portion connecting the dummy coupling portion and the dummy bottom portion and wherein the dummy fixing protrusion is at an edge of the dummy bottom portion.

In embodiments of the present invention, the base fixing protrusion and the dummy fixing protrusions may be at various locations on the base lead plate, including along edges proximate to and corresponding to either short or long side of the circuit board. Additionally, there may be a plurality of base fixing grooves and corresponding base fixing protrusions and a plurality of dummy fixing grooves and corresponding dummy fixing protrusions located in various locations on the base plate and the dummy plate, respectively.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
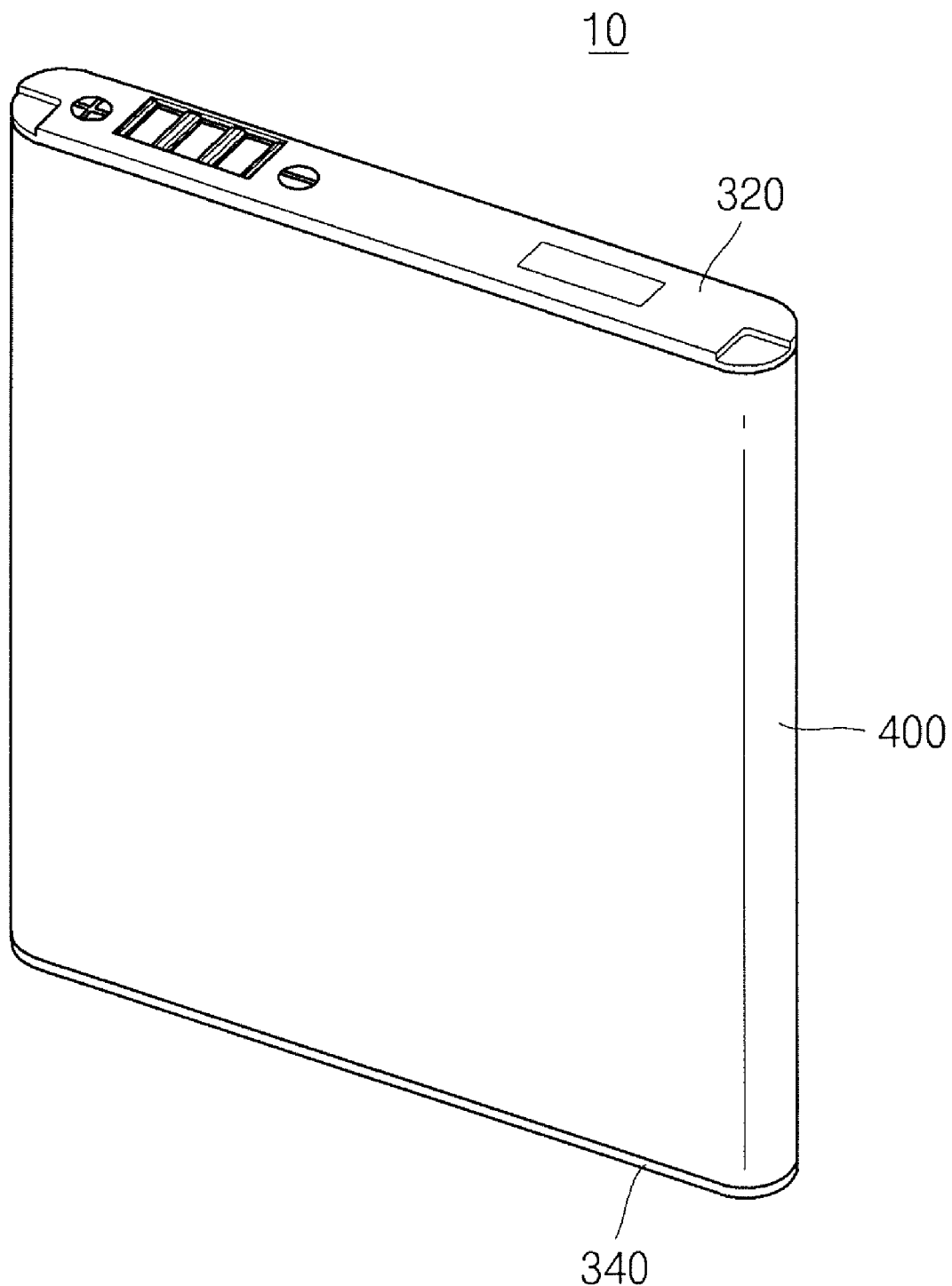
FIGS. 1a and 1b are an assembled and exploded perspective view, respectively, of a battery pack according to an embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 1B:
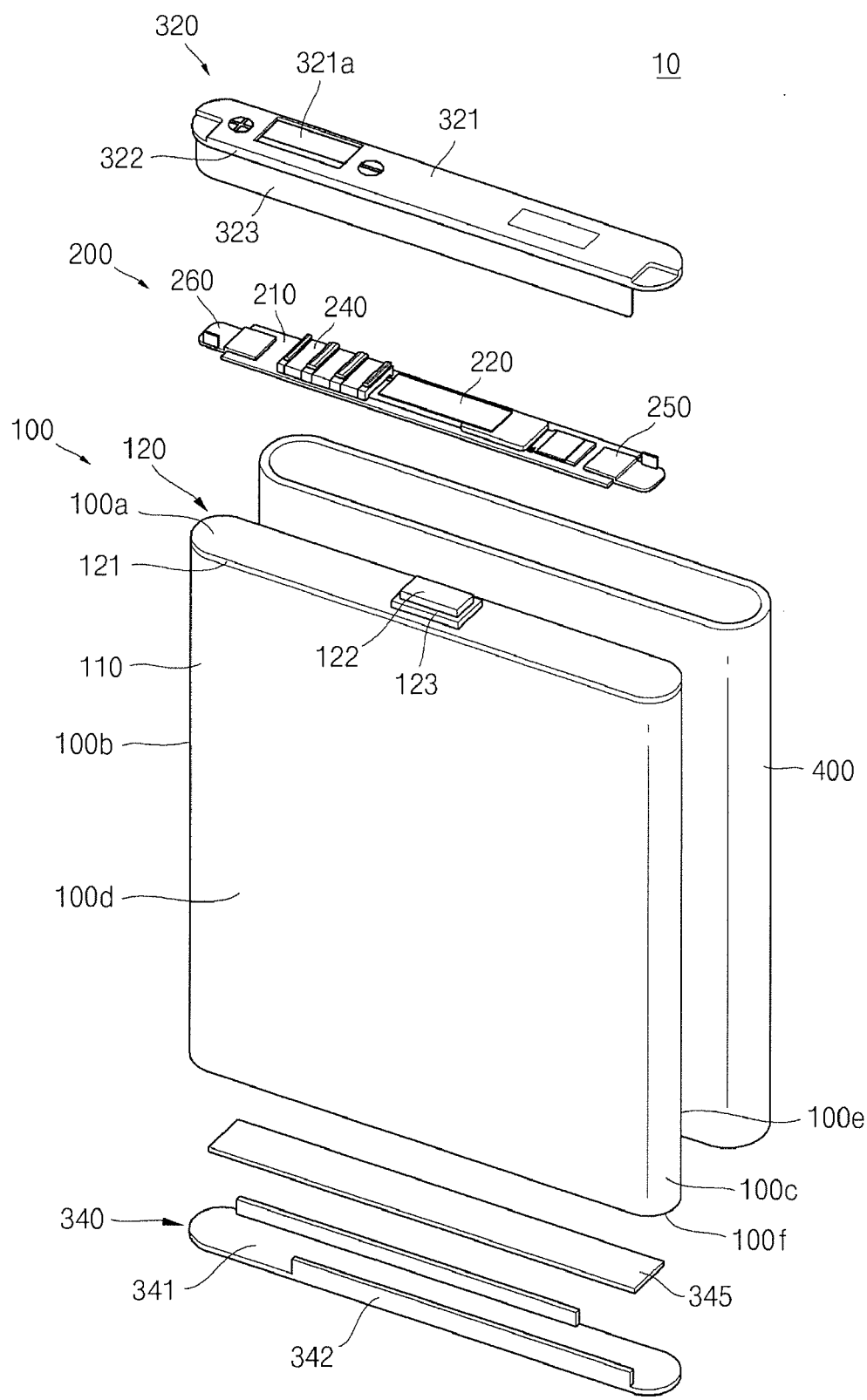
Figure 2:
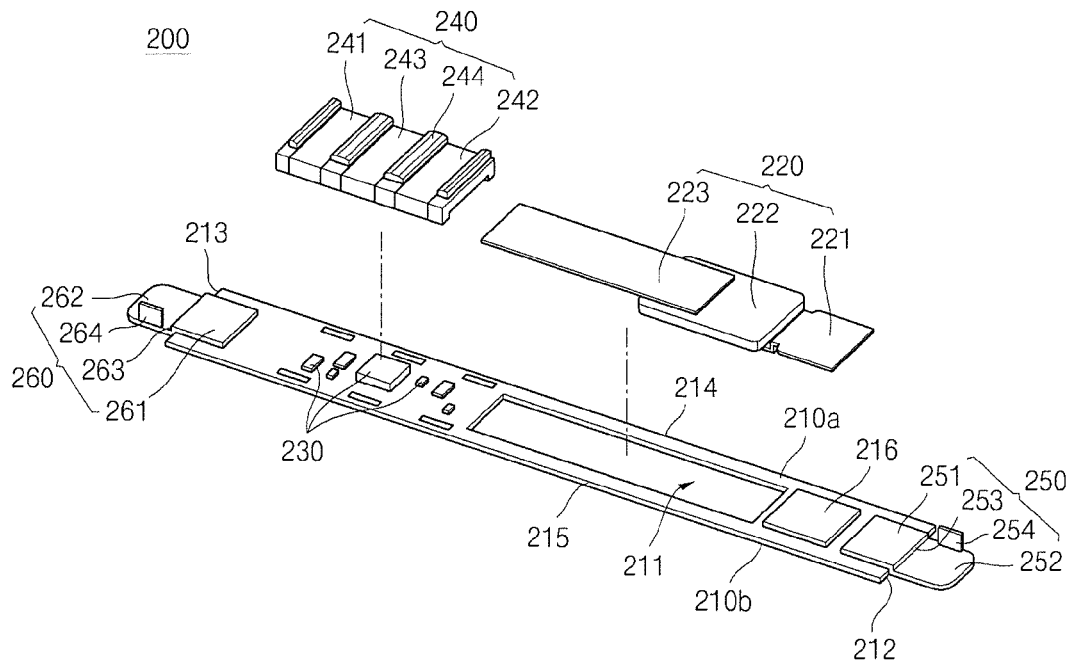
FIG. 2 is an exploded perspective view of a circuit module illustrated in FIG. 1b.
Figure 3:
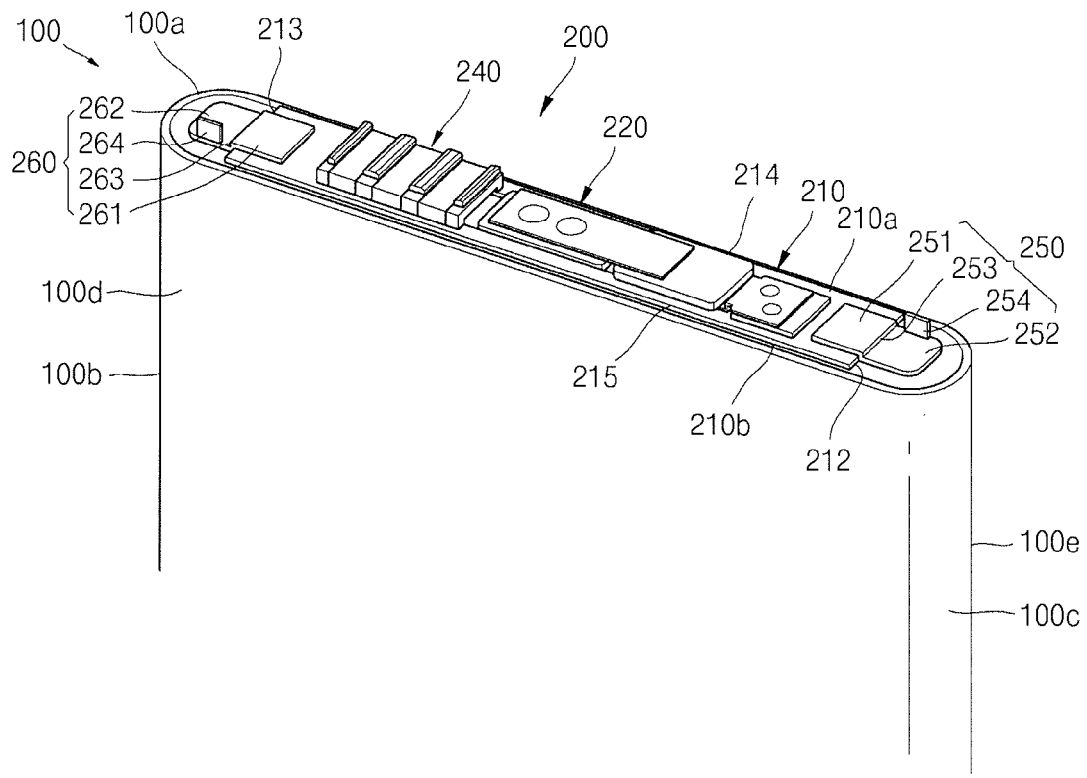
FIG. 3 is a perspective view of the bare cell and the circuit module of FIG. 1b coupled together.
Figure 4:
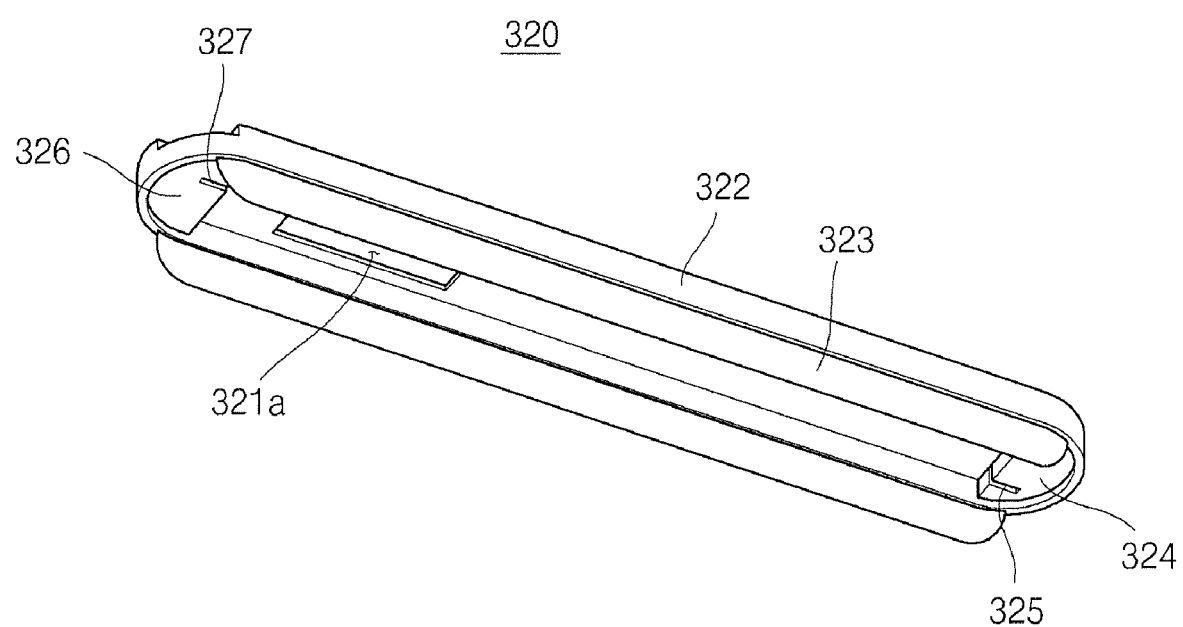
FIG. 4 is a perspective view of an upper cover illustrated in FIG. 1b.
Figure 5:
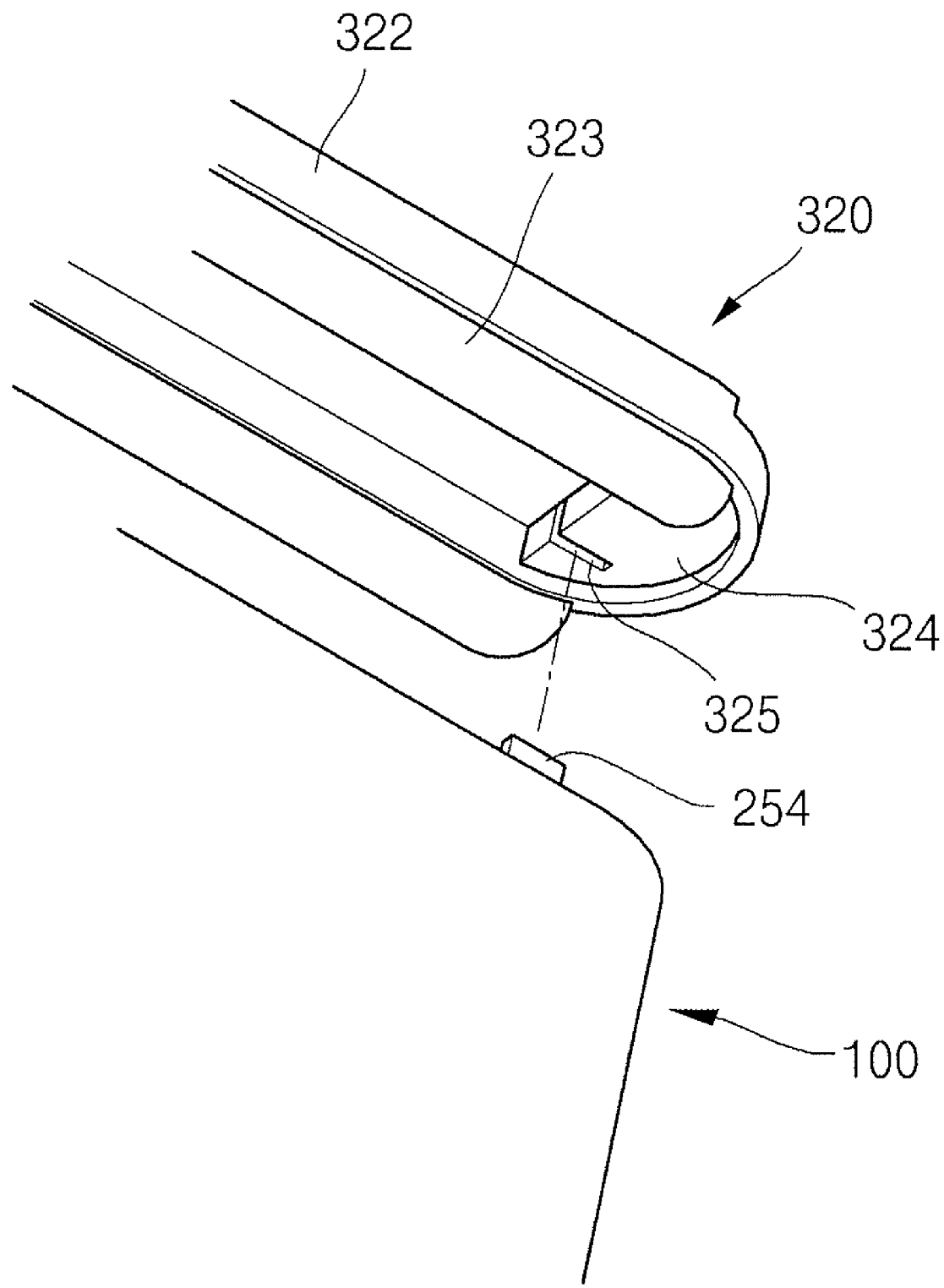
FIG. 5 is a detail exploded perspective view of the bare cell and the circuit module illustrated in FIG. 1b.

FIGS. 1a and 1b are an assembled and exploded perspective view, respectively, of a battery pack according to an embodiment of the present invention; FIG. 2 is an exploded perspective view of a circuit module illustrated in FIG. 1b; FIG. 3 is a perspective view of the bare cell and the circuit module of FIG. 1b coupled together; FIG. 4 is a perspective view of an upper cover illustrated in FIG. 1b; and FIG. 5 is a detail exploded perspective view of the bare cell and the circuit module illustrated in FIG. 1b.

Referring to FIGS. 1a and 1b, the battery pack 10 may include a bare cell 100, a circuit module 200, an upper cover 320, a lower cover 340, and a label 400.

The bare cell 100 is electrically connected to the circuit module 200 to form a core pack. The upper cover 320 and the lower cover 340 are assembled to the core pack, and then the label 400 is attached thereto to complete the assembly of the battery pack 10.

The bare cell 100 supplies electric energy. The bare cell 100 includes an electrode assembly, a container-type can 110 made of metal and accommodating the electrode assembly and an electrolyte, and a cap assembly 120 adapted to close an opening of the can 110. The electrode assembly includes a positive electrode, a negative electrode and a separator interposed between the two electrodes, and the cap assembly 120 may include a metal cap plate 121, an electrode terminal 122 protruding above the cap plate 121, and a gasket 123 interposed between the cap plate 121 and the electrode terminal 122 to insulate the electrode terminal 122 from the cap plate 121.

The can 110 and the cap plate 121 per se can serve as terminals. The can 110 and the cap plate 121 function as positive electrodes and the electrode terminal 122 functions as a negative electrode in this and the following embodiments of the present invention. However, it will be understood that the polarities of the can 110, the cap plate 121 and the electrode terminal 122 may be opposite to the polarities described above.

As illustrated in FIG. 1b, the bare cell 100 may have the following surfaces: an upper surface 100a from which the electrode terminal 122 protrudes and being insulated from the cap plate 121 through the gasket 123, a pair of short side surfaces 100b, 100c, and a pair of long side surfaces 100d, 100e, all of which are connected to the upper surface 100a and to a lower surface 100f opposite to the upper surface 100a. The short side surfaces 100b, 100c are narrower than the long side surfaces 100d, 100e. In this and the following embodiments of the present invention, the upper surface 100a and the lower surface 100f of the bare cell 100 are defined as facing upward and downward, respectively, with respect to the bare cell 100.

Referring to FIGS. 1b, 2 and 3, the circuit module 200 is disposed on and electrically connected to the bare cell 100. The circuit module 200 includes a circuit board 210, a positive temperature coefficient (PTC) device 220, a circuit device 230, an outer terminal part 240, a base lead plate 250, and a dummy lead plate 260.

The circuit board 210 has a size generally corresponding to the upper surface 100a of the bare cell 100 and is substantially quadrangular in shape. The circuit board 210 may be formed with a charge/discharge circuit pattern for controlling the charging and discharging of the battery to maintain the charged state at a constant level and a protective circuit pattern for preventing overdischarge/overcharge of the battery.

The circuit board 210 may be a thin flexible printed circuit board and may have a terminal hole 211 at a position thereof corresponding to the electrode terminal 122 of the bare cell 100. The electrode terminal 122 and the gasket 123 are inserted into the terminal hole 211 so that the lower surface 210b of the circuit board 210 can face and contact the surface of the cap plate 121, making the structure of the battery pack 10 compact. The circuit board 210 has a first short side 212, a second short side 213, a first long side 214, and a second long side 215.

An insulating tape may also be positioned between the circuit board 210 and the bare cell 100 to insulate the circuit board 210 and the cap plate 121. An adhesive material may also be applied to both surfaces of the insulating tape to adhere the circuit board 210 to the upper surface of the cap plate 121.

The PTC device 220 may be positioned on the upper surface 210a of the circuit board 210. The PTC device 220 may include a first tab 221, a PTC body 222 and a second tab 223. The first tab 221 is electrically connected to a terminal part 216 disposed on the upper surface 210a of the circuit board 210. The PTC body 222 is positioned on and electrically connected to the first tab 221. The PTC body 222 is a device whose electrical resistance approaches infinity when the temperature of the battery pack 10 exceeds a certain critical value and that can stop a flow of charge/discharge current when the battery pack 10 is overheated to an abnormally high temperature. When the temperature of the battery pack 10 is lowered below the critical value, the PTC body 222 can be restarted due to its reversible operation. Since the PTC body 222 is electrically connected to the electrode terminal 122 of the bare cell 100, it per se can function as a lead plate of the negative electrode. The second tab 223 is positioned on the PTC body 222 and is electrically connected to the electrode terminal 122 protruding through the terminal hole 211 by a suitable technique such as laser welding.

The circuit device 230 may be installed on the upper surface 210a of the circuit board 210. The circuit device 230 is electrically connected to the charge/discharge circuit pattern or the protective circuit pattern of the circuit board 210 to control the charging and discharging of the battery pack 10 or to block a flow of an overcurrent.

The outer terminal part 240 may be mounted on the upper surface 210a of the circuit board 210 and may be spaced a distance from the circuit device 230. The outer terminal part 240 serves to electrically connect the circuit board 210 to an external electronic device. The outer terminal part 240 may include metal power supply terminals 241, 242 electrically connected to the charge/discharge circuit pattern of the circuit board 210, an identification (ID) terminal 243 for checking information of the battery pack 10, and housing portions 244 made of an insulating material to insulate the terminals 241, 242, 243 from one another.

The base lead plate 250 is installed to connect one side of the circuit board 210 in the lengthwise direction and a corresponding side of the cap plate 121 in the lengthwise direction. Specifically, the base lead plate 250 is coupled to the first short side 212 of the circuit board 210 to be electrically connected to a positive electrode interconnection pattern of the circuit board 210 and extends to be electrically connected to the upper surface 100a of the bare cell 100. The base lead plate 250 is made of metal, for example, nickel or a nickel alloy. The base lead plate 250 connected to the upper surface 100a of the bare cell 100 can function as a positive electrode because the upper surface 100a of the bare cell 100 is formed by the cap plate 121 acting as a positive electrode.

Referring to FIGS. 2 and 3, the base lead plate 250 may include a base coupling portion 251, a base bottom portion 252, a base connecting portion 253 and a base fixing protrusion 254.

The base coupling portion 251 is coupled to the first short side 212 of the upper surface 210a of the circuit board 210. The base bottom portion 252 is coupled to the surface of the cap plate 121. The base connecting portion 253 is formed to connect the base coupling portion 251 and the base bottom portion 252.

The base fixing protrusion 254 is positioned at an edge of the base bottom portion 252, and in one embodiment, at an edge closest to the first long side 214 of the circuit board, and protrudes in a direction from the bare cell 100 toward the upper cover 320, which will be explained in detail later. The base fixing protrusion 254 is fixedly fitted into a base fixing groove 325 (FIG. 4) of the upper cover 320 to support the upper cover 320 against an external impact, which will also be explained later. Due to the support of the base fixing protrusion 254, the upper cover 320 can be effectively prevented from being bent or twisted when an external force is applied to the battery pack 10.

The dummy lead plate 260 is installed so as to connect the other side of the circuit board 210 in the lengthwise direction and the corresponding side of the cap plate 121 in the lengthwise direction. The dummy lead plate 260 is coupled to the second short side 213 of the circuit board 210 to be electrically connected to the positive electrode interconnection pattern of the circuit board 210 and extends to be electrically connected to the upper surface 100a of the bare cell 100.

The dummy lead plate 260 may have substantially the same shape and size as the base lead plate 250. In addition, the dummy lead plate 260 may be made of the same material as the base lead plate 250. The dummy lead plate 260 may include a dummy coupling portion 261, a dummy bottom portion 262, a dummy connecting portion 263, and a dummy fixing protrusion 264. The dummy coupling portion 261, the dummy bottom portion 262, the dummy connecting portion 263 and the dummy fixing protrusion 264 of the dummy lead plate 260 substantially correspond to the base coupling portion 251, the base bottom portion 252, the base connecting portion 253 and the base fixing protrusion 254 of the base lead plate 250, respectively, and their detailed description is omitted.

Unlike the base fixing protrusion 254 of the base lead plate 250, the dummy fixing protrusion 264 of the dummy lead plate 260 is formed at an edge of the dummy bottom portion 262 closest to the second long side 215 of the circuit board 210 to be fixedly fitted into a dummy fixing groove 327 (FIG. 4) of the upper cover 320, which will be explained later. This difference in the positions of the base fixing protrusion 254 and the dummy fixing protrusion 264 is to uniformly support opposite sides of the upper cover 320. That is, if the dummy fixing protrusion 264 of the dummy lead plate 260 is formed at an edge of the dummy bottom portion 262 closest to the first long side 214 of the circuit board 210, like the base fixing protrusion 254 of the base lead plate 250, only one side portion of the upper cover 320 would be supported intensively by the dummy fixing protrusion 264 and the base fixing protrusion 254.

Referring to FIGS. 1b, 4 and 5, the upper cover 320 is coupled to the upper part of the bare cell 100 to cover and accommodate the circuit module 200 in an inner space thereof. The upper cover 320 may be made of an insulating material. The upper cover 320 may include a cover plate 321, a side wall 322 and extension walls 323. The upper cover 320 may further include a first protrusion 324 formed with a base fixing groove 325 and a second protrusion 326 formed with a dummy fixing groove 327 therein.

The cover plate 321 may have substantially the same shape as the upper surface 100a of the bare cell 100. The inner surface of the cover plate 321 faces the upper surface 210a of the circuit board 210. The cover plate 321 has a through-hole 321a corresponding to the outer terminal part 240 of the circuit module 200. The outer terminal part 240 is exposed to the outside of the battery pack 10 through the through-hole 321a, where the battery pack 10 can be electrically connected to an external electronic device.

The side wall 322 extends from the cover plate 321 toward the circuit module 200. The extension walls 323 extend from portions of the side wall 322 corresponding to the long sides 100d and 100e of the bare cell 100 toward the circuit module 200. The extension walls 323 are surrounded by the label 400, which will be explained later.

The first protrusion 324 protrudes from one side of the bottom surface of the cover plate 321 toward the circuit module 200. The first protrusion 324 includes the base fixing groove 325 formed to correspond to the base fixing protrusion 254 of the base lead plate 250. The base fixing protrusion 254 is fixedly fitted into the base fixing groove 325 during assembly.

The second protrusion 326 protrudes from the other side of the bottom surface of the cover plate 321 toward the circuit module 200. The second protrusion 326 includes the dummy fixing groove 327 formed to face and correspond to the dummy fixing protrusion 264. The dummy fixing protrusion 264 is fixedly fitted into the dummy fixing groove 327 during assembly.

The lower cover 340 is coupled to a lower portion of the bare cell 100. The lower cover 340 may include a bottom plate 341 and extensions 342 extending from the bottom plate 341 toward the bare cell 100.

The bottom plate 341 has substantially the same shape as the lower surface 100f of the bare cell 100 and is attached to the lower surface 100f of the bare cell 100 by an adhesive member 345.

The extensions 342 cover lower portions of the long sides 100d, 100e of the bare cell 100. The extensions 342 are surrounded by the label 400, which will be explained later.

The label 400 is attached to surround the side surfaces 100b, 100c, 100d, 100e of the bare cell 100. The label 400 covers the extension walls 323 of the upper cover 320 and the extensions 342 of the lower cover 340.

As described above, in the battery pack 10 according to the embodiment of the present invention, the base fixing protrusion 254 of the base lead plate 250 and the dummy fixing protrusion 264 of the dummy lead plate 260 are fixedly fitted into the base fixing groove 325 and the dummy fixing groove 327, respectively, formed in the upper cover 320 to support the upper cover 320 against an external impact. With this configuration, the upper cover 320 can be effectively prevented from being bent or twisted when a strong external impact is applied to the battery pack 10. Therefore, the upper cover 320 can be effectively prevented from being separated from the bare cell 100.

In addition, the base fixing protrusion 254 of the base lead plate 250 is fixedly fitted into the base fixing groove 325 close to the first long side 214 of the circuit board 210 and the dummy fixing protrusion 264 of the dummy lead plate 260 is fixedly fitted into the dummy fixing groove 327 close to the second long side 215 of the circuit board 210 to uniformly support the upper cover 320 against an external impact. Therefore, the upper cover 320 can be effectively prevented from being bent or twisted by a strong externally applied impact. It will be appreciated that the locations of the fixing grooves 325, 327 and the fixing protrusions 254, 264 may be opposite to the locations described above to have generally the same effect.

Next, a description will be given of a battery pack 20 according to a further embodiment of the present invention.

Figure 6:
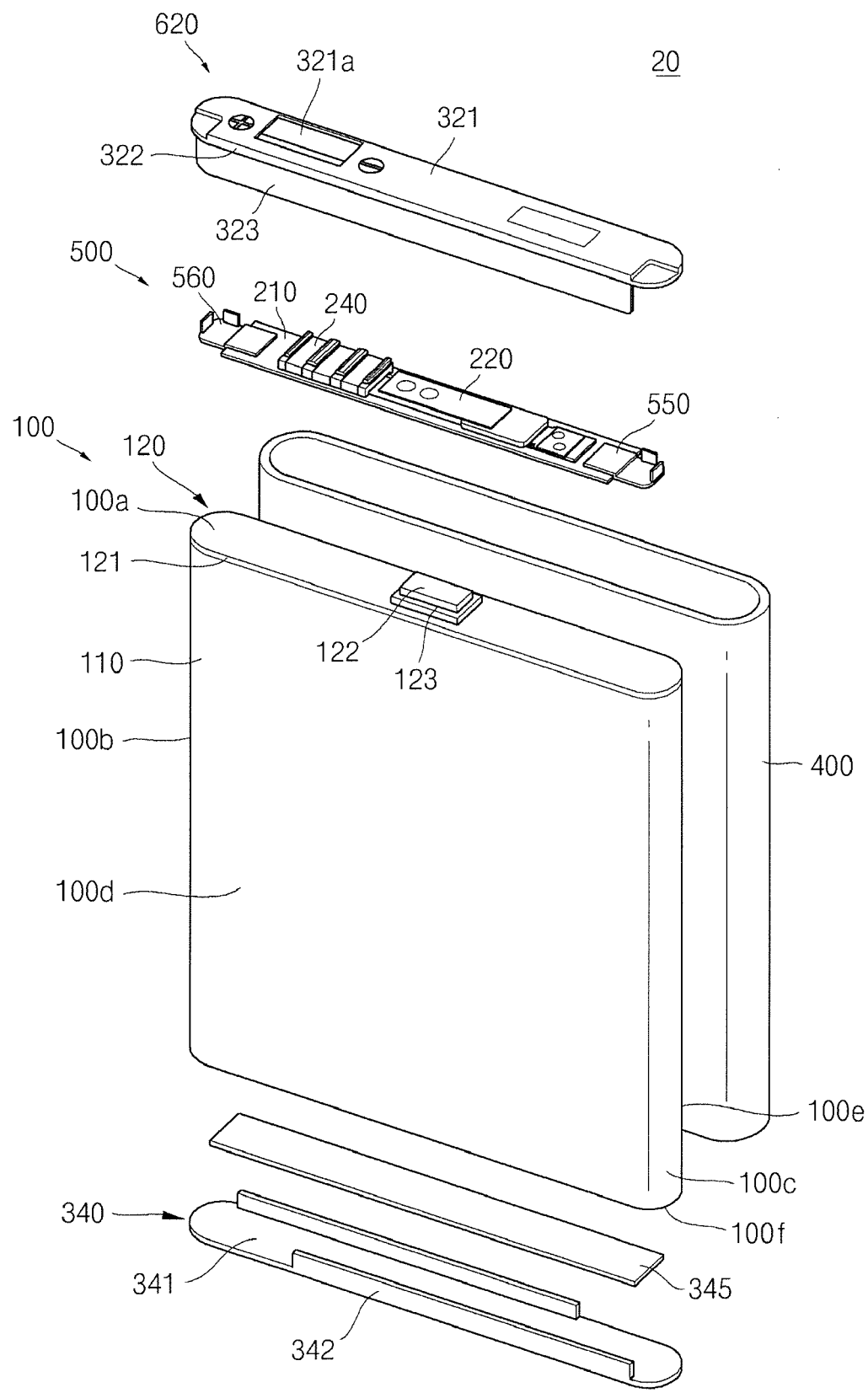
FIG. 6 is an exploded perspective view of a battery pack according to another embodiment of the present invention.
Figure 7A:
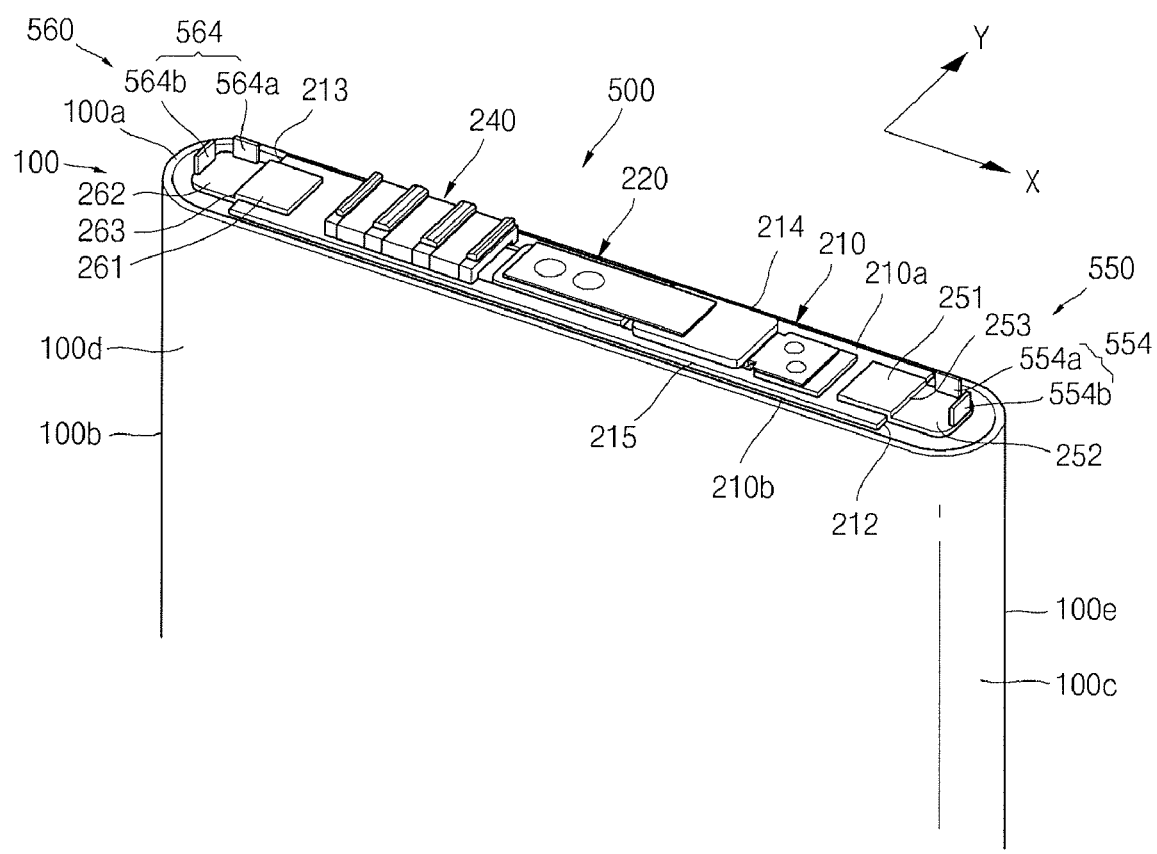
FIG. 7a is a perspective view of the bare cell and the circuit module illustrated in FIG. 6 coupled together.
Figure 7B:
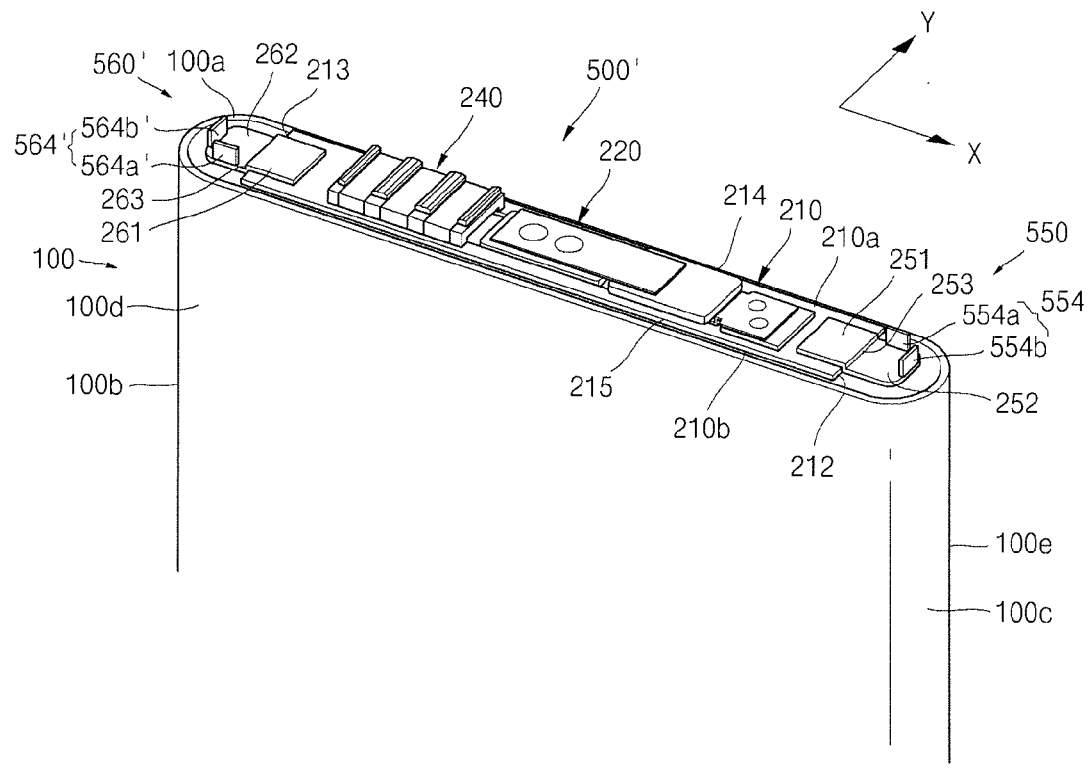
FIG. 7b is a perspective view of the bare cell illustrated in FIG. 6 coupled to a circuit module according to another embodiment of the present invention.
Figure 8:
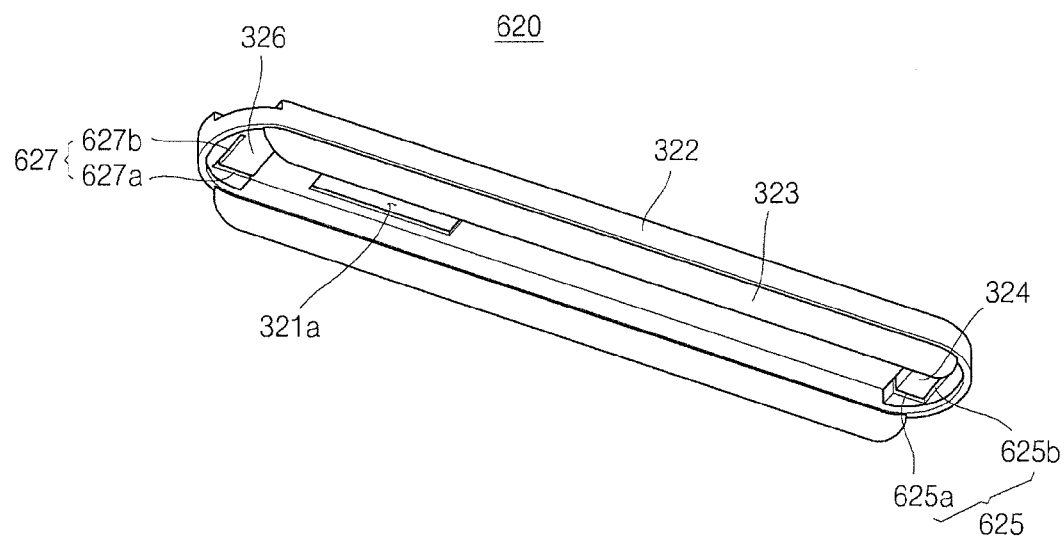
FIG. 8 is a perspective view of an upper cover illustrated in FIG. 6.
Figure 9:
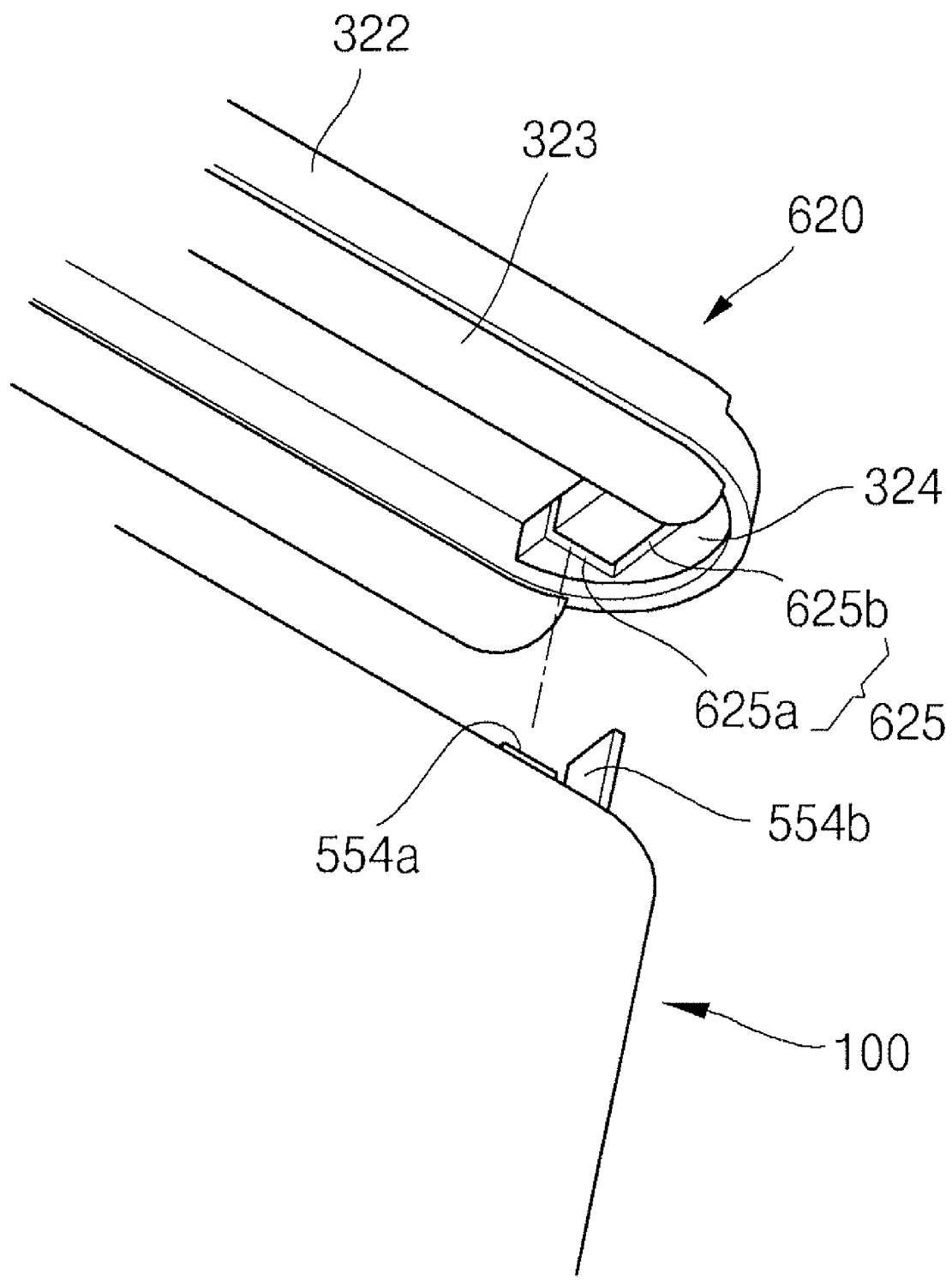
FIG. 9 is a detail exploded perspective view of the bare cell and the circuit module illustrated in FIG. 6.

FIG. 6 is an exploded perspective view of a battery pack according to another embodiment of the present invention; FIG. 7a is a perspective view of the bare cell and the circuit module illustrated in FIG. 6 coupled together; FIG. 7b is a perspective view of the bare cell illustrated in FIG. 6 coupled to another circuit module; FIG. 8 is a perspective view of an upper cover illustrated in FIG. 6; and FIG. 9 is a detail exploded perspective view of the bare cell and the circuit module illustrated in FIG. 6.

The constitution of the battery pack 20 is substantially identical to the constitution of the battery pack 10 except the number, shape and location of base fixing protrusions 554, dummy fixing protrusions 564, base fixing grooves 625 and dummy fixing grooves 627. The same reference numerals are used to designate elements having the same structure as the elements of the previous embodiment. In this description, repeated explanation of the same elements is omitted and explanation of the different elements 554, 564, 625 and 627 will be mainly provided.

Referring to FIGS. 6 through 9, the battery pack 20 may include a bare cell 100, a circuit module 500, an upper cover 620, a lower cover 340, and a label 400.

Referring to FIGS. 6 and 7a, the circuit module 500 is disposed on the upper par of the base cell 100 and electrically connected to the bare cell 100. The circuit module 500 may include a circuit board 210, a PTC device 220, a circuit device 230, an outer terminal part 240, a base lead plate 550, and a dummy lead plate 560.

The base lead plate 550 is installed to connect one side of the circuit board 210 in the lengthwise direction and a corresponding side of the cap plate 121 in the lengthwise direction. The base lead plate 550 may include a base coupling portion 251, a base bottom portion 252, a base connecting portion 253 and base fixing protrusions 554.

The base fixing protrusions 554 are positioned at edges of the base bottom portion 252 and protrude in a direction from the bare cell 100 toward the upper cover 620, which will be explained later. The base fixing protrusions 554 may include a first base protrusion 554a and a second base protrusion 554b. The first base protrusion 554a may be formed at an edge of the base bottom portion 252 closest to a first long side 214 of the circuit board 210 and the second base protrusion 554b may be formed at an edge of the base bottom portion 252 substantially parallel to a first short side 212 of the circuit board 210. The first and second base protrusions 554a, 554b are fixedly fitted into first and second base fixing grooves 625a, 625b, respectively, of the upper cover 620 to support the upper cover 620 against an external impact. With this configuration, the base fixing protrusions 554 can effectively prevent the upper cover 620 from being bent or twisted in both x- and y-axis directions (indicated by arrows in FIG. 7a) by a strong external impact applied to the battery pack 20.

The dummy lead plate 560 is installed to connect the other side of the circuit board 210 in the lengthwise direction and the corresponding side of the cap plate 121 in the lengthwise direction. The dummy lead plate 560 may include a dummy coupling portion 261, a dummy bottom portion 262, a dummy connecting portion 263, and dummy fixing protrusions 564.

The dummy fixing protrusions 564 are positioned at edges of the base dummy portion 262 and protrude in a direction from the bare cell 100 toward the upper cover 620, which will be explained later. The dummy fixing protrusions 564 may include a first dummy protrusion 564a and a second dummy protrusion 564b. The first dummy protrusion 564a may be formed at an edge of the dummy bottom portion 262 closest to the first long side 214 of the circuit board 210 and the second dummy protrusion 564b may be formed at an edge of the dummy bottom portion 262 parallel to a second short side 213 of the circuit board 210. The first and second dummy protrusions 564a, 564b are fixedly fitted into first and second dummy fixing grooves 627a, 627b, respectively, of the upper cover 620 to support the upper cover 620 against an external impact. With this configuration, the dummy fixing protrusions 564 can effectively prevent the upper cover 620 from being bent or twisted in both x- and y-axis directions by a strong external impact applied to the battery pack 20.

Referring to FIG. 7b, a circuit module 500' is provided to more uniformly support the upper cover 620 in both x- and y-axial directions than the circuit module 500 including the dummy lead plate 560 formed with the dummy fixing protrusions 564. Specifically, a dummy lead plate 560' of the circuit module 500' includes dummy fixing protrusions 564' including a first dummy protrusion 564a' at an edge of the dummy bottom portion 262 closest to the second long side 215 of the circuit board 210 and a second dummy protrusion 564b' at an edge of the dummy bottom portion 262 substantially parallel to the second short side 213 of the circuit board 210.

Referring to FIGS. 6, 8 and 9, the upper cover 620 is coupled to the upper part of the bare cell 100 to cover and accommodate the circuit module 500 in an inner space thereof. The upper cover 620 may be made of an insulating material. The upper cover 620 may include a cover plate 321, a side wall 322 and extension walls 323. The upper cover 620 may further include a first protrusion 324 formed with base fixing grooves 625 and a second protrusion 326 formed with dummy fixing grooves 627 therein.

The first protrusion 324 includes the base fixing grooves 625 which are formed corresponding to and adapted to fixedly fit into the base fixing protrusions 554 of the base lead plate 550. Specifically, the base fixing grooves 625 include a first base fixing groove 625a in an area of the upper cover 620 corresponding to the first base protrusion 554a and a second base fixing groove 625b in an area of the upper cover 620 corresponding to the second base protrusion 554b.

The second protrusion 326 includes the dummy fixing grooves 627 that are formed in areas of the second protrusion 326 corresponding to and adapted to fixedly fit into the dummy fixing protrusions 564 of the base lead plate 550. Specifically, the dummy fixing grooves 627 may include a first dummy fixing groove 627a in an area of the upper cover 620 corresponding to the first dummy protrusion 564a and a second dummy fixing groove 627b in an area of the upper cover 620 corresponding to the second dummy protrusion 564b.

As described above, in the battery pack 20 according to the embodiment of the present invention, the first and second base protrusions 554a, 554b are fixedly fitted into the first and second base fixing grooves 625a, 625b, respectively, and the first and second dummy protrusions 564a, 564b are fixedly fitted into the first and second dummy fixing grooves 627a, 627b, respectively, to stably and uniformly support the upper cover 620 in both x- and y-axis directions against an external impact. With this configuration, the upper cover 620 of the battery pack 20 can be effectively prevented from being bent or twisted in both x- and y-axis directions by a strong external impact. Therefore, the upper cover 620 can be more effectively prevented from being separated from the bare cell 100 in the battery pack 20 than in the battery pack 10.

Next, a description will be given of a battery pack 30 according to another embodiment of the present invention.

Figure 10:
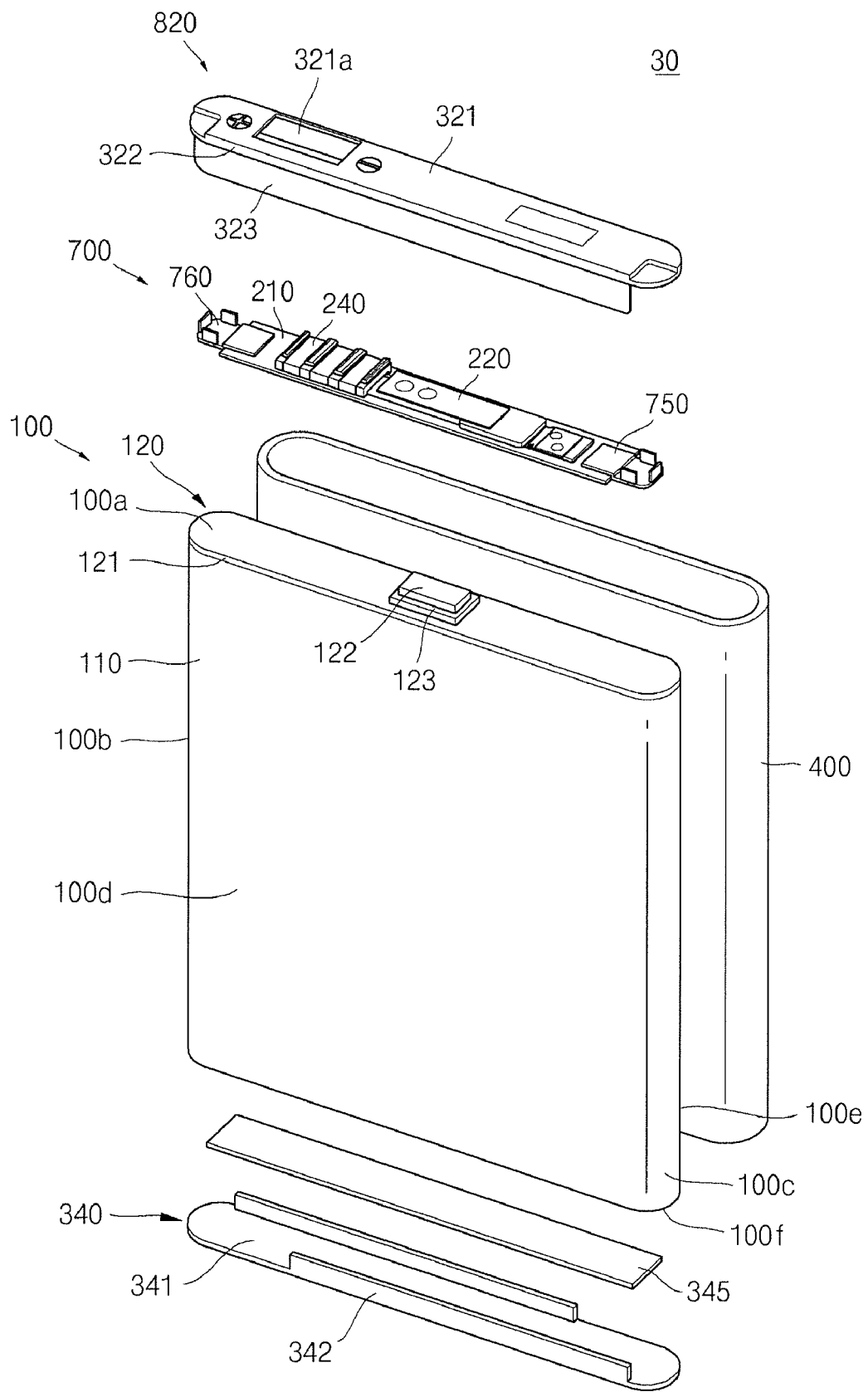
FIG. 10 is an exploded perspective view of a battery pack according to another embodiment of the present invention.
Figure 11:
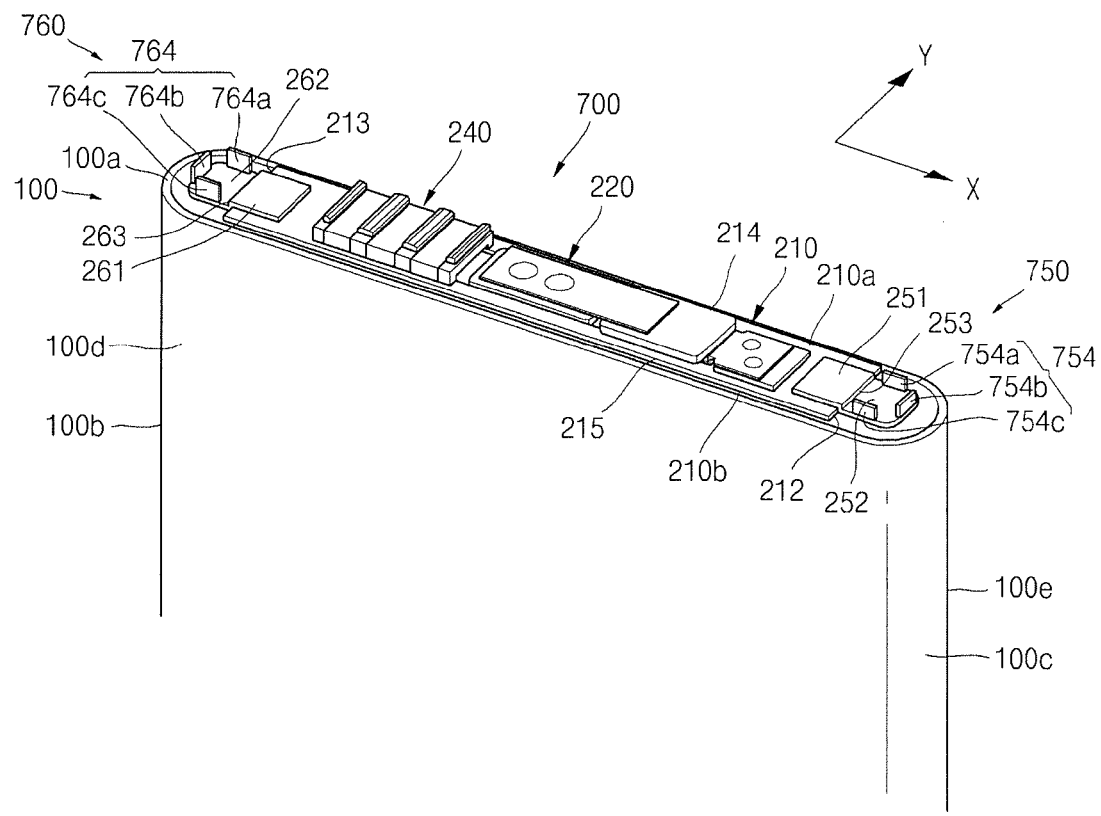
FIG. 11 is a perspective view of the bare cell and the circuit module illustrated in FIG. 10 coupled together.
Figure 12:
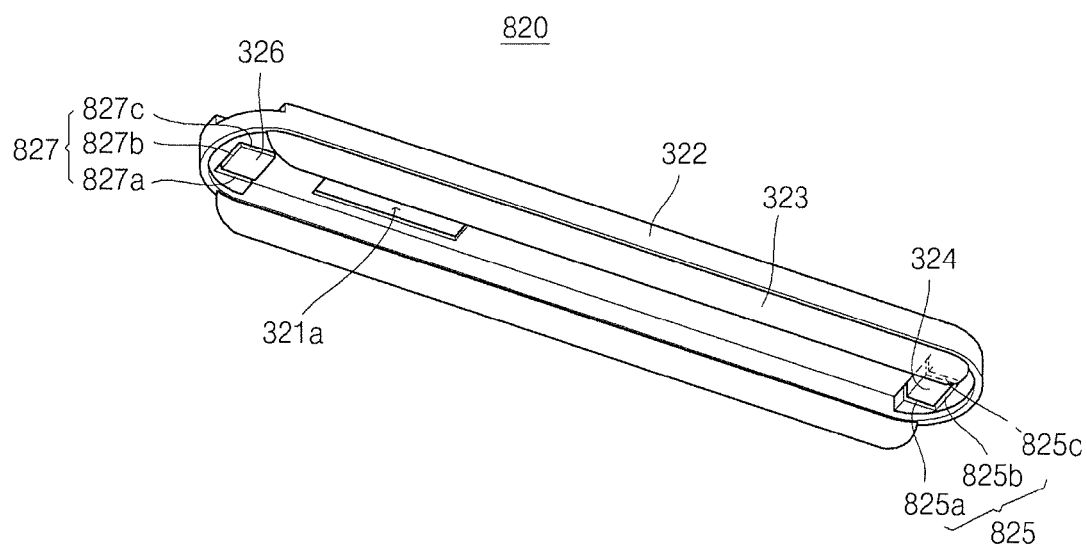
FIG. 12 is a perspective view of an upper cover illustrated in FIG. 10.
Figure 13:
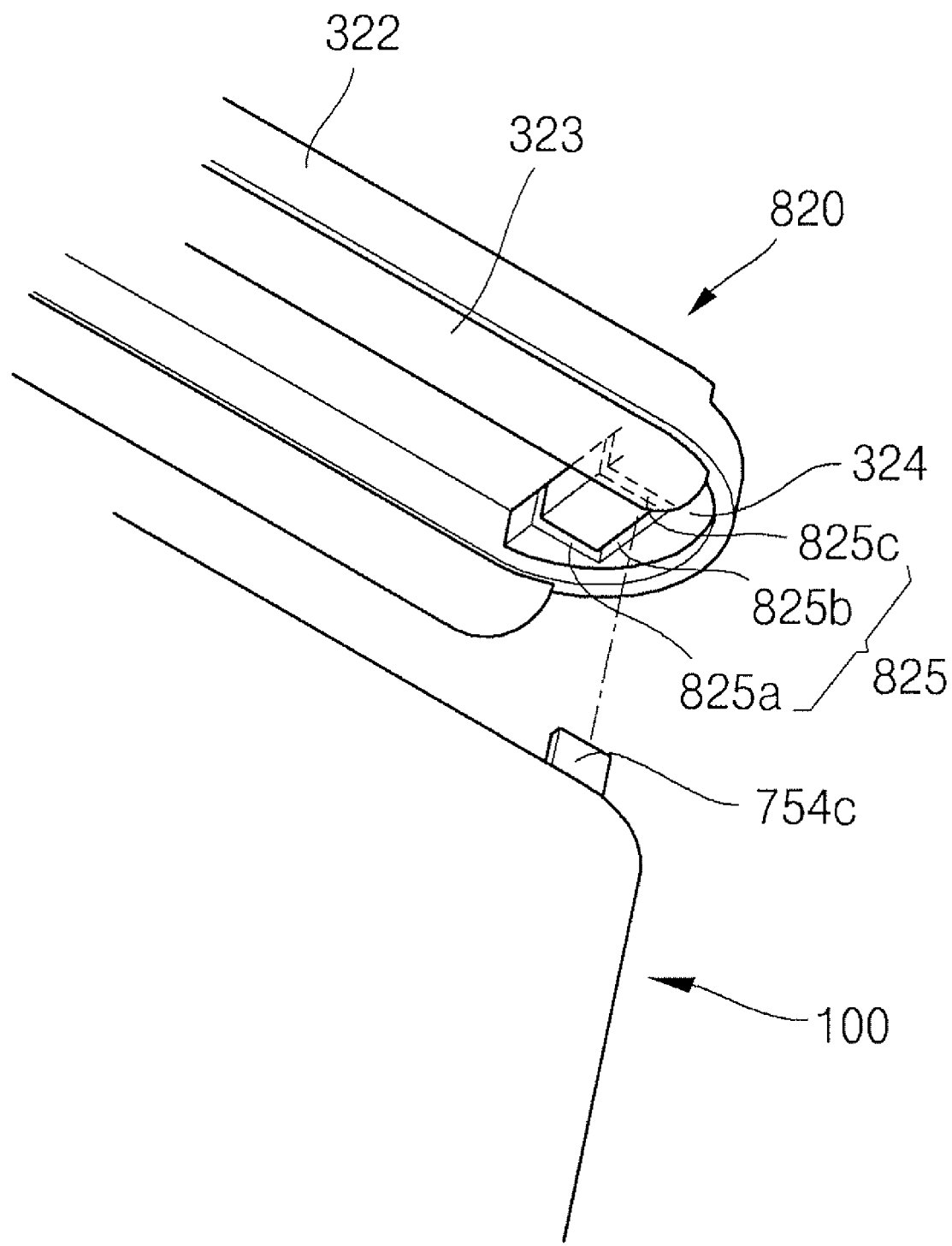
FIG. 13 is a detail exploded perspective view of the bare cell and the circuit module illustrated in FIG. 10.

FIG. 10 is an exploded perspective view of a battery pack according to another embodiment of the present invention; FIG. 11 is a perspective view of the bare cell and the circuit module illustrated in FIG. 10 coupled together; FIG. 12 is a perspective view of an upper cover illustrated in FIG. 10 and FIG. 13 is a detail exploded perspective view of the bare cell and the circuit module illustrated in FIG. 10.

The constitution of the battery pack 30 is substantially identical to the constitution of the battery pack 20 except the shapes and locations of base fixing protrusions 754, dummy fixing protrusions 764, base fixing grooves 825 and dummy fixing grooves 827. The same reference numerals are used to designate elements having the same structure as the elements of the previous embodiments. In this description, repeated explanation of the same elements is omitted and explanation of the different elements 754, 764, 825 and 827 will be mainly provided.

Referring to FIGS. 10 through 13, the battery pack 30 may include a bare cell 100, a circuit module 700, an upper cover 820, a lower cover 340, and a label 400.

Referring to FIGS. 10 and 11, the circuit module 700 is disposed on and electrically connected to the bare cell 100. The circuit module 700 may include a circuit board 210, a PTC device 220, a circuit device 230, an outer terminal part 240, a base lead plate 750, and a dummy lead plate 760.

The base lead plate 750 is installed to connect one side of the circuit board 210 in the lengthwise direction and a corresponding side of the cap plate 121 in the lengthwise direction. The base lead plate 750 may include a base coupling portion 251, a base bottom portion 252, a base connecting portion 253 and base fixing protrusions 754.

The base fixing protrusions 754 are positioned at edges of the base bottom portion 252 and protrude in a direction from the bare cell 100 toward the upper cover 820, which will be explained later. The base fixing protrusions 754 may include a first base protrusion 754a, a second base protrusion 754b and a third base protrusion 754c. The first base protrusion 754a may be formed at an edge of the base bottom portion 252 closest to a first long side 214 of the circuit board 210, the second base protrusion 754b may be formed at an edge of the base bottom portion 252 substantially parallel to a first short side 212 of the circuit board 210, and the third base protrusion 754c may be formed at an edge of the base bottom portion 252 closest to a second long side 215 of the circuit board 210. The first, second and third base protrusions 754a, 754b, 754c are fixedly fitted into first, second and third base fixing grooves 825a, 825b, 825c of the upper cover 820, respectively, to support the upper cover 820 against an external impact. With this configuration, the base fixing protrusions 754 can effectively prevent the upper cover 820 from being bent or twisted in both x- and y-axis directions (indicated by arrows in FIG. 11) by a strong external impact applied to the battery pack 30.

The dummy lead plate 760 is installed to connect the other side of the circuit board 210 in the lengthwise direction and the corresponding side of the cap plate 121 in the lengthwise direction. The dummy lead plate 760 includes a dummy coupling portion 261, a dummy bottom portion 262, a dummy connecting portion 263, and dummy fixing protrusions 764.

The dummy fixing protrusions 764 are positioned at edges of the base dummy portion 262 and protrude in a direction from the bare cell 100 toward the upper cover 820, which will be explained later. The dummy fixing protrusions 764 may include a first dummy protrusion 764a, a second dummy protrusion 764b and third dummy protrusion 764c. The first dummy protrusion 764a may be formed at an edge of the dummy bottom portion 262 closest to the first long side 214 of the circuit board 210, the second dummy protrusion 764b may be formed at an edge of the dummy bottom portion 262 substantially parallel to a second short side 213 of the circuit board 210, and the third dummy protrusion 764c may be formed at an edge of the dummy bottom portion 262 closest to the second long side 215 of the circuit board 210. The first, second and third dummy protrusions 764a, 764b, 764c are fixedly fitted into first, second and third dummy fixing grooves 827a, 827b, 827c, respectively, of the upper cover 820, to support the upper cover 820 against an external impact. With this configuration, the dummy fixing protrusions 764 can effectively prevent the upper cover 820 from being bent or twisted in both x- and y-axis directions by a strong external impact applied to the battery pack 30.

Referring to FIGS. 10, 12 and 13, the upper cover 820 is coupled to the upper part of the bare cell 100 to cover and accommodate the circuit module 700 in an inner space thereof. The upper cover 820 may be made of an insulating material. The upper cover 820 may include a cover plate 321, a side wall 322 and extension walls 323. The upper cover 820 may further include a first protrusion 324 formed with base fixing grooves 825 and a second protrusion 326 formed with dummy fixing grooves 827 therein.

The first protrusion 324 includes the base fixing grooves 825 formed to correspond to and are adapted to fixedly fit into the base fixing protrusions 754 of the base lead plate 750. Specifically, the base fixing grooves 825 may include a first base fixing groove 825a in an area of the upper cover 820 corresponding to the first base protrusion 754a, a second base fixing groove 825b in an area of the upper cover 820 corresponding to the second base protrusion 754b, and a third fixing groove 825c in an area of the upper cover 820 corresponding to the third base protrusion 754c.

The second protrusion 326 includes the dummy fixing grooves 827 formed in areas of the second protrusion 326 corresponding to the dummy fixing protrusions 764 of the dummy lead plate 760. The dummy fixing protrusions 764 are fixedly fitted into the respective dummy fixing grooves 827 during assembly. Specifically, the dummy fixing grooves 827 may include a first dummy fixing groove 827a in an area of the upper cover 820 corresponding to the first dummy protrusion 764a, a second dummy fixing groove 827b in an area of the upper cover 820 corresponding to the second dummy protrusion 764b, and a third dummy fixing groove 827c in an area of the upper cover 820 corresponding to the third dummy protrusion 764c.

As described above, in the battery pack 30 according to the embodiment of the present invention, the first, second and third base protrusions 754a, 754b, 754c are fixedly fitted into the first, second and third base fixing grooves 825a, 825b, 826c, respectively, and the first, second and third dummy protrusions 764a, 764b, 764c are fixedly fitted into the first, second and third dummy fixing grooves 827a, 827b, 827c, respectively, to stably and uniformly support the upper cover 820 against an external impact. Therefore, the upper cover 820 of the battery pack 30 can be more effectively prevented from being bent or twisted in both x- and y-axis directions by a strong external impact than in the battery pack 20.

As is apparent from the above description, in the battery pack according to aspects of the present invention, the fixing protrusions formed in the circuit module coupled to the bare cell are fixedly fitted into the respective fixing grooves formed in the upper cover to effectively prevent bending or twisting of the upper cover by an external impact, so that the upper cover is prevented from being separated from the bare cell.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising
   a bare cell including a cap plate and an electrode terminal insulated from the cap plate,
   a circuit module including a circuit board electrically connected to the bare cell and including a base lead plate attached to the circuit board and a base fixing protrusion extending from the base lead plate, and
   an upper cover adapted to cover the circuit module, the upper cover including a base fixing groove adapted to mate with the base fixing protrusion.

2. The battery pack of claim 1, wherein the circuit module further comprises a dummy lead plate coupled to the circuit board, the dummy lead plate having a dummy fixing protrusion protruding toward the upper cover,
   wherein the upper cover further comprises a dummy fixing groove adapted to mate with the dummy fixing protrusion.

3. The battery pack of claim 1, wherein the base lead plate is connected to a first side of the cap plate.

4. The battery pack of claim 2, wherein the dummy lead plate is connected to a second side of the cap plate.

5. The battery pack of claim 1, wherein the circuit board has a first short side, a second short side generally opposite the first short side, a first long side and a second long side generally opposite the first long side.

6. The battery pack of claim 2, wherein the circuit board has a first short side, a second short side generally opposite the first short side, a first long side and a second long side generally opposite the first long side.

7. The battery pack of claim 5, wherein the base lead plate further comprises a base coupling portion coupled to the first short side of the circuit board, a base bottom portion coupled to the cap plate, and a base connecting portion connecting the base coupling portion and the base bottom portion; and
   wherein the base fixing protrusion is at an edge of the base bottom portion.

8. The battery pack of claim 6, wherein the dummy lead plate further comprises a dummy coupling portion coupled to the second short side of the circuit board, a dummy bottom portion coupled to the cap plate, and a dummy connecting portion connecting the dummy coupling portion and the dummy bottom portion; and
   wherein the dummy fixing protrusion is at an edge of the dummy bottom portion.

9. The battery pack of claim 5, wherein the base fixing protrusion is at an edge of the base lead plate proximate to the first long side of the circuit board.

10. The battery pack of claim 6, wherein the dummy fixing protrusion is at an edge of the dummy lead plate proximate to the second long side of the circuit board.

11. The battery pack of claim 5, wherein the base fixing protrusion comprises a first base protrusion at an edge of the base lead plate proximate to the first long side of the circuit board and a second base protrusion at an edge of the base lead plate proximate to the first short side of the circuit board.

12. The battery pack of claim 11, wherein the base fixing groove comprises a first base fixing groove adapted to receive the first base protrusion and a second base fixing groove adapted to mate with the second base protrusion.

13. The battery pack of claim 6, wherein the dummy fixing protrusion comprises a first dummy protrusion at an edge of the dummy lead plate proximate to the first long side of the circuit board and a second dummy protrusion at an edge of the dummy lead plate substantially parallel to the second short side of the circuit board.

14. The battery pack of claim 13, wherein the dummy fixing groove comprises a first dummy fixing groove adapted to receive the first dummy protrusion and a second dummy fixing groove adapted to mate with the second dummy protrusion.

15. The battery pack of claim 6, wherein the dummy fixing protrusion comprises a first dummy protrusion at an edge of the dummy lead plate proximate to the second long side of the circuit board and a second dummy protrusion at an edge of the dummy lead plate substantially parallel to the second short side of the circuit board.

16. The battery pack of claim 5, wherein the base fixing protrusion comprises a first base protrusion at an edge of the base lead plate proximate to the first long side of the circuit board, a second base protrusion at an edge of the base lead plate substantially parallel to the first short side of the circuit board, and a third base protrusion at an edge of the base lead plate proximate to the second long side of the circuit board.

17. The battery pack of claim 16, wherein the base fixing groove comprises a first base fixing groove adapted to receive the first base protrusion, a second base fixing groove adapted to mate with the second base protrusion, and a third fixing groove adapted to mate with the third base protrusion.

18. The battery pack of claim 6, wherein the dummy fixing protrusion comprises a first dummy protrusion at an edge of the dummy lead plate proximate to the first long side of the circuit board, a second dummy protrusion at an edge of the dummy lead plate substantially parallel to the second short side of the circuit board, and a third dummy protrusion at an edge of the dummy lead plate proximate to a second long side of the circuit board.

19. The battery pack of claim 18, wherein the dummy fixing groove comprises a first dummy fixing groove adapted to receive the first dummy protrusion, a second dummy fixing groove adapted to mate with the second dummy protrusion, and a third dummy fixing groove adapted to mate with the third dummy protrusion.

20. The battery pack of claim 6, wherein the upper cover comprises:
   a cover plate, a side wall extending from an edge of the cover plate toward the circuit module;
   extension walls extending from the side wall toward the circuit module;
   a first protrusion protruding from a first side of the bottom surface of the cover plate toward the circuit module and including the base fixing groove into which the base fixing protrusion is fitted; and
   a second protrusion protruding from a second side of the bottom surface of the cover plate toward the circuit module and including the dummy fixing groove into which the dummy fixing protrusion is fitted.

21. The battery pack of claim 1, wherein the circuit board is a flexible printed circuit board.

22. The battery pack of claim 1, wherein the circuit module comprises a circuit device on an upper surface of the circuit board.

23. The battery pack of claim 1, wherein the circuit board is in contact with the cap plate at the lower surface of the cap plate.

24. The battery pack of claim 1, wherein the circuit board has a terminal hole generally corresponding to and adapted to receive the electrode terminal.

25. The battery pack of claim 1, wherein the circuit module comprises a PTC device on the circuit board electrically connected to the electrode terminal.

* * * * *